(12) United States Patent
Chen et al.

(10) Patent No.: US 10,459,920 B2
(45) Date of Patent: Oct. 29, 2019

(54) SUPPORT ACTUAL AND VIRTUAL SQL DATAFLOW BY STREAMING INFRASTRUCTURE

(71) Applicants: Qiming Chen, Sunnyvale, CA (US); Meichun Hsu, Sunnyvale, CA (US)

(72) Inventors: Qiming Chen, Sunnyvale, CA (US); Meichun Hsu, Sunnyvale, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 981 days.

(21) Appl. No.: 14/439,919

(22) PCT Filed: Oct. 31, 2012

(86) PCT No.: PCT/US2012/062838
§ 371 (c)(1),
(2) Date: Sep. 3, 2015

(65) Prior Publication Data
US 2016/0034535 A1 Feb. 4, 2016

(51) Int. Cl.
*G06F 16/2455* (2019.01)
*G06F 16/25* (2019.01)
*G06F 16/951* (2019.01)

(52) U.S. Cl.
CPC ........ *G06F 16/24568* (2019.01); *G06F 16/25* (2019.01); *G06F 16/951* (2019.01)

(58) Field of Classification Search
CPC .. G06F 16/24568; G06F 16/25; G06F 16/951; G06F 17/30516; G06F 17/30557; G06F 17/30864
See application file for complete search history.

(56) References Cited

U.S. PATENT DOCUMENTS

2008/0275891 A1* 11/2008 Park ................. G06F 17/30533
2010/0250572 A1* 9/2010 Chen ................. G06F 17/3051
707/759
2011/0196856 A1* 8/2011 Chen ................. G06F 17/30516
707/713

* cited by examiner

*Primary Examiner* — Taelor Kim
(74) *Attorney, Agent, or Firm* — HPI Patent Department

(57) ABSTRACT

A method includes binding a stationed operator to a database query engine, wherein the stationed operator comprises system utilities and an open executor to execute user-supplied application logic. The method further includes receiving an unbounded input stream of input tuples by the stationed operator, the stream of input tuples comprising a succession of chunks. The method also includes applying a query defined by the application logic to each successive chunk of the input stream to produce an output packet for each such chunk, and generating an unbounded output stream comprising the output packets.

14 Claims, 6 Drawing Sheets

SUPPORT ACTUAL AND VIRTUAL SQL DATAFLOW BY STREAMING INFRASTRUCTURE

BACKGROUND

Data processing may involve storing data in a database table and then running queries on the previously stored data. Real-time stream analytics attempts to process data as it is received without first storing all data in a database table. Real-time stream analytics has increasingly gained popularity to help enterprises capture and update business information just-in-time, and analyze continuously generated "moving data" from sensors, mobile devices, social media of all types, to thereby gain live business intelligence.

BRIEF DESCRIPTION OF THE DRAWINGS

For a detailed description of various examples, reference will now be made to the accompanying drawings in which.

DETAILED DESCRIPTION

Overview

Figure 1:
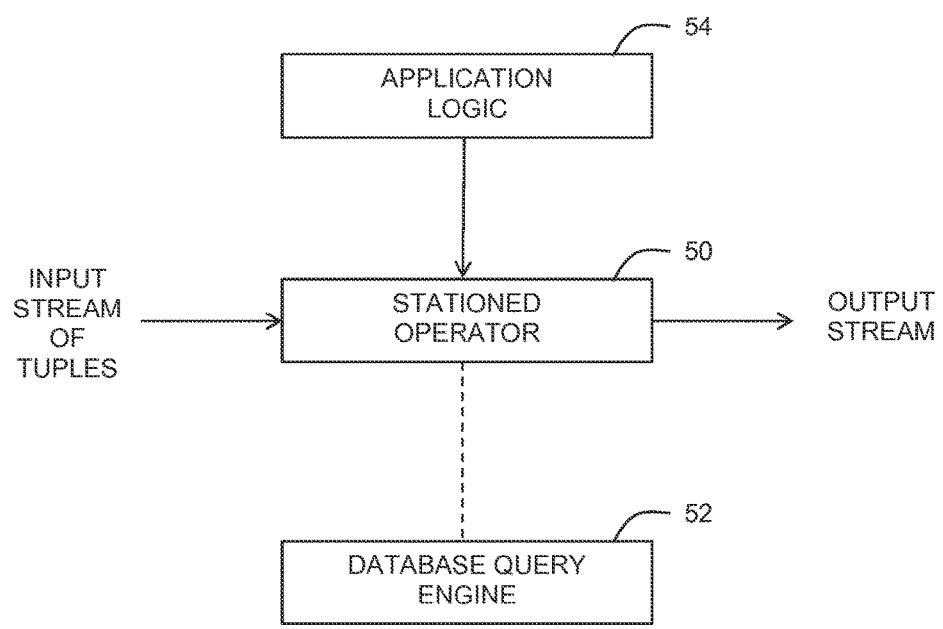
FIG. 1 illustrates an example of use of a stationed operator in accordance with various implementations.

Disclosed herein is an example of a stream analytics platform for processing continuous, real-time data-flow with a graph-structured topology. The disclosed illustrative platform may comprise a parallel, distributed and elastic platform containing one or more logical operators. Each logical operator may be executed by, for example, multiple physical instances running in parallel over distributed server nodes. The operators may be flexibly defined by users of the platform.

Although the operators for stream analysis are defined based on application logic, many of the operators have common execution patterns in such functions as input/output (I/O), blocking, data grouping, and the like, which represent their "meta-properties" and are categorized to facilitate providing unified system support. Such categorization of meta-properties helps to ensure the operational semantics, optimize the execution, as well as to ease users' efforts in otherwise having to deal with these properties manually which may otherwise result in fragile code, disappointing performance and incorrect results, especially when elasticity is involved.

Unlike applying an operator to data, stream processing is characterized by the flowing of data through a stationed operator. Motivated by supporting operator execution patterns automatically and systematically, the disclosed system describes an open-station as the container of a stream operator. As noted above, stream operators may be classified based on their meta-properties and required system support, and provide specific open-stations for supporting them accordingly. In this way, a station class hierarchy is formed with each class facilitated with an open-executor as well as related system utilities. In the object oriented programming context, the open-executor may be coded by invoking various desired abstract functions (methods) to be implemented by users based on their desired application logic. Thus the open station provides designated system support, while open for user-specific application logic to be plugged-in.

The disclosed platform is based on the use of open stations in the context of stream processing. The platform ensures the correctness of data-parallelism with respect to the stateful stream operators where the stream data partitioning and data buffering should be consistent. In general, open stations provide a canonical operational framework, standardize the operator execution patterns, and support such patterns systematically and automatically.

Based on various features described below, the platform provides a generalized computation platform. First, a database query language station family is provided which allows certain tasks to be expressed by a desired database query language directly which are naturally linked with other tasks in the dataflow. An example of such a database query language is the Structured Query Language (SQL) and, without loss of generality, the database query language station is referred to herein as a SQL station.

A SQL station provides an open-executor for processing one or more SQL queries on the input stream of tuples (e.g., objects) on a chunk-wise basis. A chunk comprises one or more tuples. A SQL station provides system utilities for connecting to a database query engine, preparing SQL statements, and executing SQL queries—which may be transparent to users. A SQL station under the object-oriented context may be a class with such system functions pre-defined, and with some abstract functions declared but not yet implemented.

With SQL stations, two abstractions can be implemented in the context of continuous stream processing:

A stationed SQL query can be applied directly to the input stream on a chunk by chunk basis which integrates stream processing with database query processing, and integrates stream processing programs with query engines;

SQL queries can be applied on "big" data to be pushed down to a database layer for fast data access and reduced data move, while the station acts as the controller or agent for the underlying data processing. In this case, the dataflow between stations are not the actual raw data but only the messages bearing control parameters (e.g., timestamps), for the next operation. Such "streaming virtualization" provides the foundation for integrating dataflow and workflow (task orchestration).

Both of such implementations are explained in detail below.

The open executor is defined by invoking these abstract functions. The open executor may not be fully implemented, but the user does not need to define the executor. The user extends the open station class by an application class, and implements these abstract functions. In this way, application logic can be "plugged in" to the open-executor. For example the user may provide an application-specific SQL statement for querying the database. The epoch station example is used to illustrate this concept.

FIG. 1 illustrates an implementation that shows a stationed operator 50 bound to a database query engine 52 (e.g., an SQL query engine). Binding the stationed operator 50 to the database query engine 52 may include establishing a logical association between the operator and a database query engine. Further, application logic 54 can be inserted into the stationed operator 50. The insertion of application logic 54 into the stationed operator may occur by way of a user extending the open station class and implementing various abstract methods as desired.

Using the configuration of FIG. 1, the stationed operator 50 can be caused to bind to the database query engine 52. Once so bound, the stationed operator 50 may receive an input stream of tuples and apply the inserted application logic 54 to each successive chunk of the input stream using the database query engine 52. As a result, the stationed operator 50 may produce an output packet based on each chunk and generate an output stream including the output packets.

Figure 2:
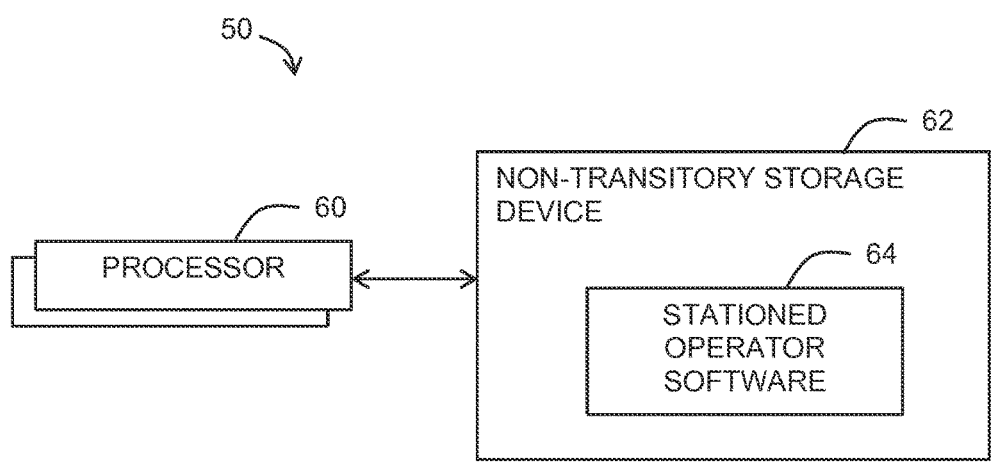
FIG. 2 illustrates an example of a stationed operator in accordance with various implementations.

FIG. 2 shows an illustrative implementation of the stationed operator of FIG. 1 in the form of a stationed operator module. The implementation shown in FIG. 2 may apply to any of the operators discussed herein. FIG. 2 shows one or more processors 60 coupled to a non-transitory storage device 62. The processors 60 may be contained in a single computer (e.g., a server) or may be distributed across multiple servers. The non-transitory storage device 62 may comprise volatile storage (e.g., random access memory) or non-volatile storage (e.g., a hard disk drive, etc.). The processors 60 execute software contained on the non-transitory storage device 62 such as stationed operator software 64 as shown in FIG. 2. The stationed operator software 64, upon being executed by the processors 60, imbues the stationed operator 50 with some or all of the functionality described herein. The stationed operator software 64 may comprise system utilities, the application logic 54 provided by a user, and any other suitable type of code. The stationed operator module thus may include the processors 60 executing the software 64 from the storage device 62.

Figure 3:
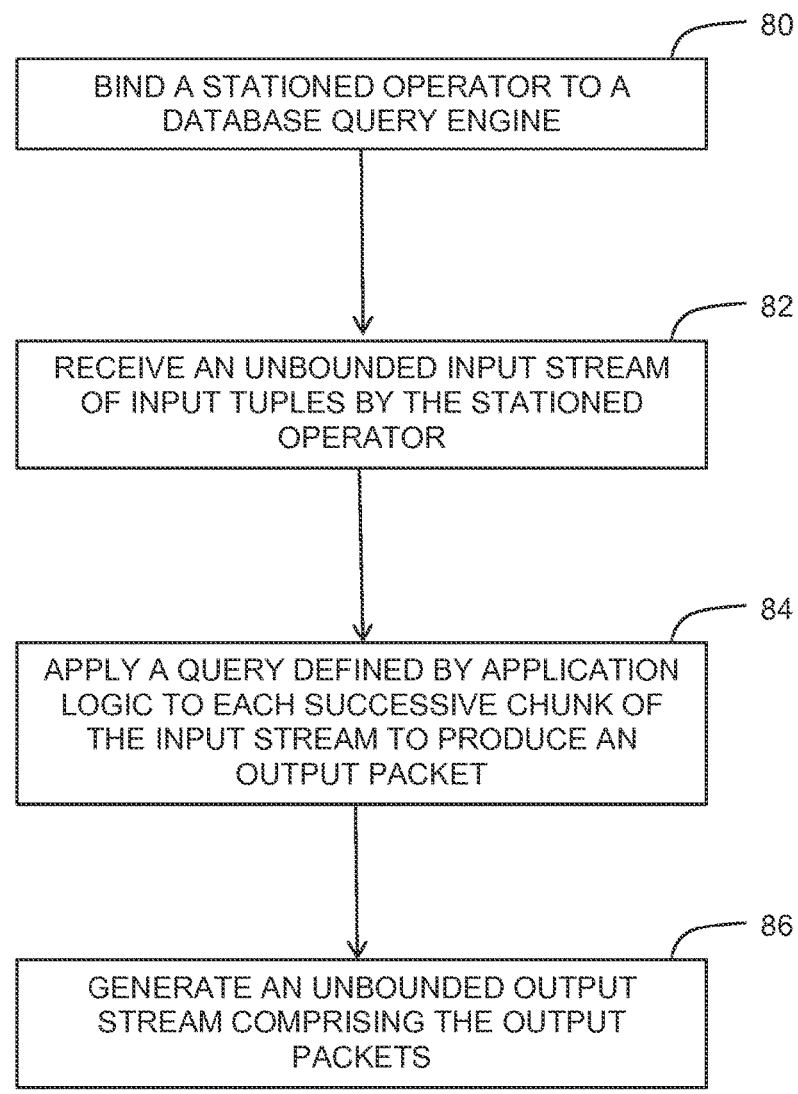
FIG. 3 illustrates a method in accordance with various implementations.

FIG. 3 shows an example of a method that may be performed by the processor 60 of FIG. 2 upon executing stationed operator software 64. The actions depicted in in FIG. 3 may be performed in the order shown or in a different order, and two or more of the operations may be performed in parallel rather than serially.

At 80, the method comprises binding a stationed operator to a database query engine. The stationed operator may comprise system utilities and an open executor to execute user-supplied application logic. The method further comprises receiving (82) an unbounded input stream of input tuples by the stationed operator. The stream of input tuples may include a succession of chunks. Further, the method includes applying (84) a query defined by the application logic to each successive chunk of the input stream to produce an output packet for each such chunk. At 86, the method comprises generating an unbounded output stream comprising the output packets.

The Platform

The disclosed platform comprises a real-time, continuous, parallel and elastic stream analytics platform on executing a cluster of machine nodes. One node may implement the coordinator server while other nodes implement agent servers. The coordinator is responsible for distributing code around the cluster, assigning tasks to machines, and monitoring the cluster for failures. Each agent interacts with the coordinator and executes various operator instances of the dataflow process.

A stream is an unbounded sequence of tuples, and a tuple is a list of objects. Each stream operator transforms its input stream into a new stream based on its user-specified application logic. The graph-structured stream transformations are packaged into a "topology" which is the top-level dataflow process. When an operator emits a tuple to a stream, the operator sends the tuple to all successor operators subscribing to that stream. A stream grouping specifies how to group and partition the tuples input to an operator. Different types of stream groupings are possible such as hash-partition, replication, random-partition, etc.

To support elastic parallelism, a logical operator may execute by multiple physical instances, as threads, in parallel across the cluster, and messages are passed between operators in a distributed way. Therefore, unlike a statically configured platform, the disclosed platform can be scaled over a grid of computers "elastically" for parallel computing.

Figure 4:
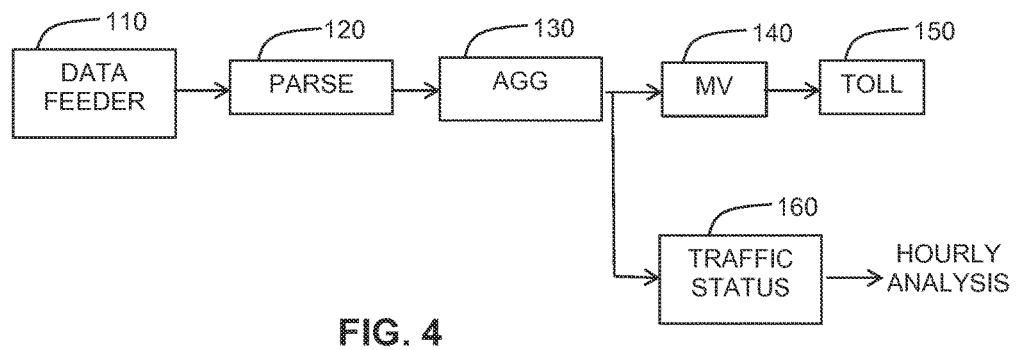
FIG. 4 illustrates an example of use of the principles discussed herein.

A modified Linear-Road (LR) benchmark can be used to illustrate the notion of stream process. FIG. 4 illustrates a process comprising a data feeder 110, a parse station 120, an aggregation (Agg) station 20, a moving (MV) average station 140, a toll calculation station 150, and a traffic status station 160. The illustrative process modeled in FIG. 4 includes traffic on, for example, 10 expressways; each expressway having two directions and 100 segments. The position of each car is read every 30 seconds and each reading represents an event, or a stream tuple, with attributes including vehicle identification (vehicle_id), timestamp, speed (mph), xway (expressway), direction (dir), and segment (seg). The data feeder 110 obtains such data. The parse station 120 parses the data based on various pre-established criterion. For example, the incoming data may simply be split for parallel processing. The average traffic speed per minute per segment is computed by the Agg station 130. The past n-minute (e.g., 5 minute) moving averages for traffic speed are computed by the MV station 140. Based on those calculations, the tolls are calculated by the toll calculation station 150. Additionally, the traffic status is analyzed and reported every hour by traffic status station 160.

Many stream operations have common characteristics and fall in the same execution pattern. Accordingly, stream operations can be categorized to facilitate systematic support rather than each operator being hand-coding one by one.

For an analogy, consider how a database query engine provides dedicated execution support to Select, Project, Join (SPJ) operations. A query is iteratively processed tuple by tuple by the database query engine facilitated with a list of executors for the system operations. Providing these executors is the system responsibility, while the user responsibility is to provide input parameters to these system operations in the SQL query. The operations not directly expressible by SQL can be coded as User Defined Functions (UDFs) for which the database query engine may provide support.

Compared to writing SQL queries with predefined operators, coding stream operations in Java or other languages offers the flexibility of application development. However, for enforcing semantics and easing user's effort, dedicated execution support may be helpful.

The execution pattern of a class of stream operators depends on their meta-properties as well as the special execution support they require. As noted above, the meta-properties may comprise such properties as I/O, blocking, caching, and grouping, although additional or different meta-properties are possible as well. Regarding I/O characteristics, a stream operator can be implemented to process the stream data tuple-wise or chunk-wise. Regarding blocking characteristics, an operator may be configured as a block operator to block the input incrementally (e.g., per-chunk aggregation), or as a pool. Regarding caching characteristics, a stream operator may maintain four levels of potential cache states: per-process, per-chunk, per-input (may cover the processing of multiple outputs) and per-return. For grouping characteristics, to send a stream to the receiving operator instances, the tuples may be grouped/partitioned randomly with even distribution, by hashing.

Classifying operators advantageously supports their execution patterns automatically and systematically which greatly simplifies users' efforts and enhances the development quality of streaming applications. A noted above, each open-station class is provided with an "open executor" as well as related system utilities for executing the corresponding kind of operators. The open executor invokes the abstract methods, which are defined in the station class but implemented by users with application logic. As such, a station provides the designated system support, while open for the application logic to be plugged-in by a user through abstract methods. A user defined operator captures the designated characteristics by subclass at the appropriate station, and captures the application logic by implementing the abstract methods accordingly.

For example, in an EpochStation for chunk-wise and group-wise (partitioned) data processing, the methods nextChunk( ) and execute( ) are station-provided and hidden from user programs where nextChunk( ) is coded based on the given chunking criterion and execute( ) invokes several abstract methods to be implemented by users in sub-classing the station based on the application logic.

```
public boolean nextChunk(Tuple, tuple) {// group specific ...}
public void execute(Tuple tuple, BasicOutputCollector collector) {
  boolean new_chunk = nextChunk(tuple);
  String grp = getGroupKey(tuple);
  GroupMeasures gm = null;
  if (new_chunk)  gm = getGKV( ).dump(grp);
  updateState(getGKV( ), tuple, grp);
  if (new_chunk) //emit last chunk
  processChunkByGroup(gm, collector)
}
```

Stations may be classified based on the common properties of the hosted tasks, including those associated with specific functionalities. The following discussion describes the SQL station family for integrating stream processing with query processing.

Interacting Stream Analysis with SQL Databases Engines

As discussed above, the tasks in a stream analysis topology are stream analysis programs written in Java or other Java Virtual Machine (JVM)-based languages. To enhance the power and broaden the applicability of the platform, the SQL station family is provided to allow certain tasks to be expressed by SQL which are naturally linked with other tasks in the dataflow.

SQL Station Hierarchy

A SQL station provides an open-executor for applying one or more SQL queries to the source data chunk by chunk. A data chunk can be the stream input falling in a window boundary (e.g., the chunks that are received in a given time period or a prescribed number of chunks), or the ranged segments of database tables. A SQL station is an abstract class that underlies various application specific tasks with the following common characteristics.

While SQL queries are normally applied to a stored table, the disclosed platform permits stationed SQL queries to be applied to the input stream on a chunk-by-chunk basis.

A feature of an SQL station is to operate chunk-wise on the input data, although a chunk can be a single tuple. This is, on one hand, to situate the continuous analysis context as many analytic queries are aggregation oriented which have undefined semantics on the unbounded stream data. On the other hand, applying a query tuple by tuple is inefficient due to the overhead involved with query set-up and tear-down, and in that case using a Java program could be a better choice.

For applying a SQL query to a database table, the above chunking principle is represented by applying the query to a segment of the table according to the stream input. Such a query may be parameterized, and the parameters are extracted from one or more chunks of the input stream tuples.

The SQL stations form a sub class hierarchy, where the root, SqlStation, provides the common methods for initially (only once in the continuous streaming processing) connecting to the database query engine, obtaining the input schema from the topology, etc. For chunking (e.g., tuples falling in 1 minute intervals or every 100 tuples), the SQL station defines the integer variables current, delta and ceiling, namely the "position" of the current tuple, the size of a chunk (e.g., 1 minute by timestamp, 100 by count, etc.), as well as the upper-bound of the chunk boundary. The general chunking method inheritable by all subclasses may be implemented as provided below:

```
public boolean nextChunk(Tuple tuple) {
  int current = getCurrent(tuple);
  if (current >= ceiling) {
    ceiling = (current/delta + 1)*delta;
    return true;
  }
  return false;
}
```

Based on the above algorithm, a chunk is completed when the first tuple belonging to the next chunk is received, and the ceiling is advanced to the upper-bound of the next chunk. The method getCurren(Tuple tuple) is an abstract method and may be implemented based on the application. For example, the following implementation obtains the timestamp from the input tuple.

```
public int getCurrent(Tuple tuple) {
  return (tuple.getIntegerByField("minute")).intValue( );
}
```

The following implementation obtains and increments the current count:

```
public int getCurrent(Tuple tuple) {
  return current++;
}
```

In addition, abstract methods for binding query parameters using the information extracted from input tuple(s), etc. may be implemented.

Stream SQL Stations

In accordance with various examples, stream SQL stations include queries directly with the stream data, rather than retrieving from the database. The input data schema may be analyzed by the stream SQL station automatically from the topology defined by the output declarations of upstream stations. In some implementations, two abstract SQL stream station classes may be implemented: SqlStreamInsertStation and SqlStreamQueryStation, both of which are discussed below.

SqlStreamInsertStation:

SqlStreamInsertStation is an abstract class defined with an open executor. With a station subclassing it, no insert query need to be specified. In the initial phase, the station determines the input schema, generates an insert query accordingly (the insert query is done only once), and then inserts the incoming stream data chunk by chunk. The chunk boundary is determined from the information extracted from the input tuples.

The user is responsible for implementing the abstract methods getCurrent(Tuple tuple) for checking the chunk-end, and msgToNext(Tuple tuple) for sending output. Further, inserted tuples may be streamed out. Further still, a token per chunk may be streamed out to pass information to the next task. The insertion is made by one or more bulk inserts for each chunk of data. The bulk size is independent of the number of tuples in the chunk.

For example, the constructor of a class that implements SqlStreamQueryStation may comprise:

LR_InsertStation insert=new LR_InsertStation(1, "jdbc:vertica://adb-04.hpl.hp.com:5433/test", "com.vertica.Driver", "vertica", " ", "LRdata", true);

where the first parameter, 1, represents the chunk delta. In this example, each chunk contains the tuples with timestamps falling in a 1-minute time boundary. The last parameter is a Boolean value in which "true" means that the data to be inserted should continue to flow out, and "false" means the sink of these data but the station may send a message, about the status (e.g., the current timestamp) to the next station.

At runtime, the above LR_InsertStation obtains the timestamp from the input tuple, and after bulk-inserting each chunk of data, sends a token to the next task. The token includes the timestamp. This functionality may be implemented by the following abstract methods.

```
public int getCurrent(Tuple tuple) {
    return (tuple.getIntegerByField("minute")).intValue( );
}
public Values msgToNext(Tuple tuple){
    int minute = tuple.getIntegerByField("minute").intValue( );
    return new Values(minute);
}
```

SQL Stream Query Station

With a SQL stream query station, stream data flows into the station, is processed by a SQL query, and the results flow out. Although a connected database engine may be used, the database engine is transparent to the applications. Further, the streaming data may not be written to a hard disk drive for permanent storage.

The open executor of the SQL stream query station may define how to apply the specified query to the input stream on a chunk-wise basis. In memory a temporary table may be created with the schema captured from the input stream data schema and the name derived from the station name. The generic data source specified in the query (e.g., $STREAM) may be replaced by the name of the above temporary table. In the beginning of the processing of each chunk, the temporary table is truncated and then bulk inserted with the tuples belonging to the current chunk. By the end of the chunk, the content of the temporary table is queried, with the query results streaming out from the station.

For example, the LR_AggStreamQueryStation, that extends the SQL stream query station, can be constructed in the following way.

LR_AggStreamQueryStation streamQuery=new LR_AggStreamQueryStation(1, "jdbc:vertica://adb-04.hpl.hp.com:5433/test", "com.vertica.Driver", "vertica", " ", "SELECT minute, xway, dir, seg, AST(AVG (speed) AS INTEGER) AS avg_speed,"+"SUM (DISTINCT vid) AS volume FROM $STREAM WHERE minute=?"+"GROUP BY minute, xway, dir, seg");

Similar to the above, the first parameter, 1, represents the chunk delta of 1 minute, i.e., each chunk contains the tuples with timestamps falling in the 1-minute time boundary. Accordingly, the user may implement the getCurrent(Tuple tuple) method in the same way as described above.

DB SQL Station

The database (DB) SQL station holds a task specified as a SQL query and applies the query to database table rather than the incoming stream data. To accommodate the chunk-wise query processing, such a query is a parameterized range query. Typically the parameters are obtained from the input tuples.

Unlike a SQL stream query station, with a DB SQL station the query results may or may not flow to the data streaming layer; and if not, the station outputs a message, rather than a data set, to the operations of the downstream stations. Such messages comprise the parameters for those operations. Such "streaming virtualization" provides the foundation for integrating dataflow and workflow, for task orchestration.

Abstract classes including SqlDBQueryStation and SqlDBUpdateStation are supported. The actual station classes which extend these stations may implement the following abstract methods.

public abstract int getCurrent(Tuple tuple);
public abstract void bindQuery(Tuple tuple, PreparedStatement st);
public abstract Values msgToNext(Tuple tuple);

For example, the LR_AggDBStation that extends SqlDBUpdateStation can be constructed in the following way:

LR_AggDBStation db_agg=new LR_AggDBStation(1, "jdbc:vertica://adb-04.hpl.hp.com:5433/test", "com.vertica.Driver", "vertica", " ", "INSERT INTO LRagg SELECT minute, xway, dir, seg,"+"CAST(AVG (speed) AS INTEGER) AS avg_speed,"+"SUM(DISTINCT vid) AS volume FROM LRdata WHERE minute=?"+"GROUP BY minute, xway, dir, seg");

And the bindQuery method is implemented as below.

```
public void bindQuery(Tuple tuple, PreparedStatement st) {
    int minute = getCurrent(tuple);
    try {
        st.setInt(1, minute-1);
    } catch (SQLException e) { }
}
public int getCurrent(Tuple tuple) {
    return (tuple.getIntegerByField("minute")).intValue( );
}
```

Integrating Dataflow and Workflow

As described above, a SQL station may have streaming data passed through at the streaming layer, or passed by at the database layer. In the latter case (pass by), the station controls the in-database data manipulation like an agent; its output is not the real data processing results, but a message to the next station for passing operation parameters, etc.

Pass-Through

Conceptually, the stream data pass through the SQL station for processing with the results streaming out. A database query engine functions as the stream data processor. With this mechanism, benefits include taking advantage of the expressive power of the query language (e.g., SQL), accessing the query engine's data processing facility, and minimizing user-created code for task development. In addition to introducing a database query engine into stream processing, this mechanism integrates multiple data management systems under the abstraction of continuous dataflow.

Figure 5:
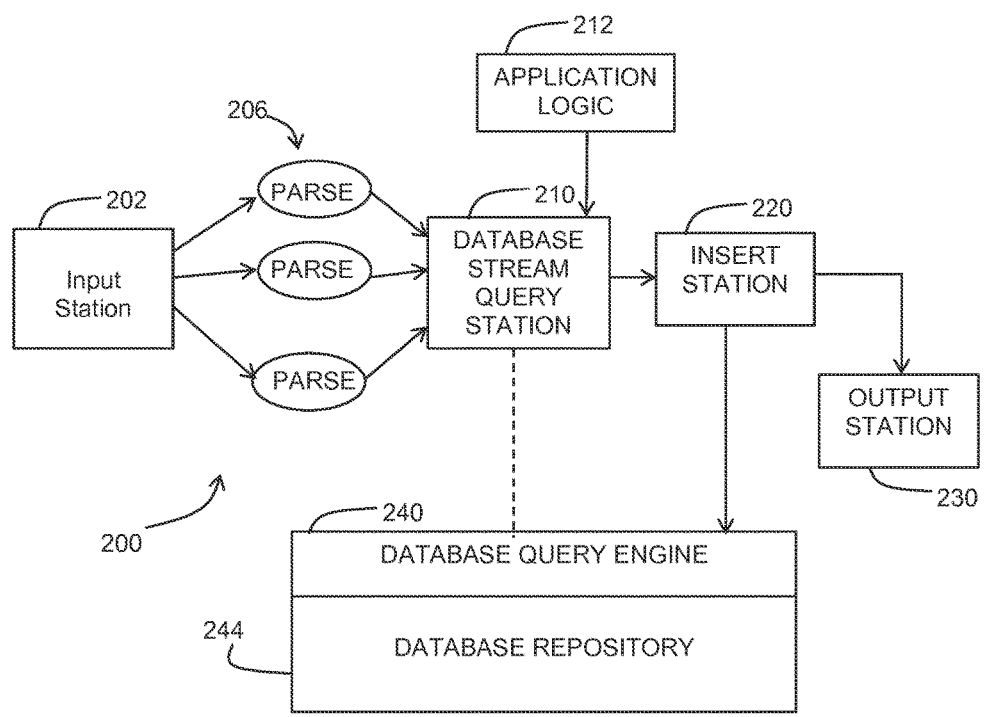
FIG. 5 illustrates a pass-through system example in accordance with various implementations.

Referring now to FIG. 5, an example of a system 200 is shown comprising an input station 202 and multiple parsers 206 which parse the input stream received by the input station 202 and provide streams of tuples to a database stream query station 210. The input station 202 generates the original tuples based on input events such as those from various sensors. User-specified application logic 212 is provided and is inserted into the database stream query station 210. The database stream query station 210 is bound to a database query engine 240 and applies the application logic 212 to each successive chunk of the input stream using the database query engine 240. Each such chunk may be defined the input tuples (data packets) themselves. The input stream of input tuples from parsers 206 defines a table in a database repository 244.

The database stream query station 210 applies the application logic 212 to successive chunks of the table to produce an output packet from each chunk, and outputs a stream of output packets that contain a result of the application logic 212 to each chunk. The database stream query station 210 may thereby generate a stream of output packets that contain a message about the parameters of the application logic 212. This process is referred to as a "pass-through" process because the stream of tuples need not be stored in the database and instead, the database stream query station 210 is processed as it is received without necessarily being pre-stored in a database repository. However, if desired, the database stream query station 210 may also store the results of the application of the application logic 212 in the database repository 244.

The stream analysis topology shown in FIG. 5 is specified below, where the query station has stream data passed through.

```
public class Sql_PassThrough_Topology {
  public static void main(String[ ] args) throws Exception {
  FileReadlineSpout spout = new LR_MiniBatchSpout1(args[0], 100);
  BasicStation parse = new LR_MiniBatchParseStation( );
  LR_AggStreamQueryStation streamQuery = new
      LR_AggStreamQueryStation(1, "jdbc:vertica://adb-
      04.hpl.hp.com:5433/test", "com.vertica.Driver", "vertica", "",
      "SELECT minute, xway, dir, seg, CAST(AVG(speed) AS
      INTEGER) " + "AS avg_speed, SUM(DISTINCT vid) AS
      volume FROM $STREAM " + "WHERE minute = ? GROUP BY
      minute, xway, dir, seg");
  LR_InsertStation insert = new LR_InsertStation( 1, "jdbc:vertica://adb-
      04.hpl.hp.com:5433/test", "com.vertica.Driver", "vertica", "",
      "LRagg", true);
  PrintStation print = new PrintStation( );
  TopologyBuilder builder = new TopologyBuilder( );
  builder.setSpout("spout", spout, 1);
  builder.setBolt("parse", parse, 8).shuffleGrouping("spout");
  builder.setBolt("streamQuery", streamQuery, 1).shuffleGrouping("parse");
  builder.setBolt("insert", insert, 1).shuffleGrouping("streamQuery");
  builder.setBolt("print", print, 1).shuffleGrouping("insert");
  ...
```

In this topology, the data stream from the "parse" stations 206 flow through the "streamQuery" station for aggregation (as mentioned above, actually supported by the underlying query engine); the results flow from the streamQuery station to the insert station, and are appended to the database and continue flow to the next station, which may, for example, a print station.

Pass-By

Figure 6:
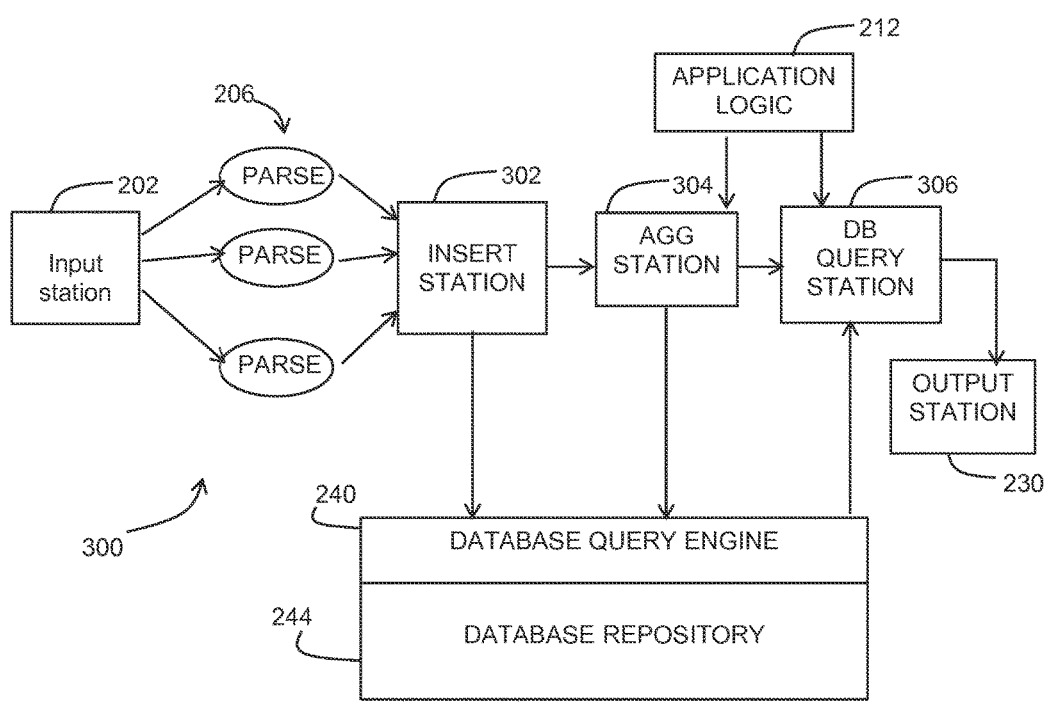
FIG. 6 illustrates a by-pass example in accordance with various implementations.

In the pass-by scenario, conceptually the stream data flow is in the underneath database systems, where in the streaming layer the dataflow is "virtual." Therefore, SQL stations with Pass-By features are referred to as virtual SQL stations. A virtual SQL station pushes the data manipulation down to the database layer for fast data access and reduced data move, but receives tokens from the upstream stations and/or send tokens to the downstream stations. These tokens may include or otherwise represent the parameters for the next operation. In this sense the streaming platform is used as the orchestration engine for the underlying tasks. FIG. 6 shows a Pass-By example.

Referring now to FIG. 6, an example of a system 300 is shown comprising an input station 202 and multiple parsers 206 which parse the input stream received by the input station 202 and provide streams of tuples to an insert station 302. The insert station 302 inserts the received tuples chunk by chunk into the database repository for subsequent processing by stations 304 and/or 306. User-defined application logic 212 is inserted into stations 304 and 306 as discussed above. Messages are generated by insert station 302 and are provided to an aggregation (Agg) station 304. The messages may comprise information regarding the tuples. The Agg station 304 receives the messages from the insert station 302 and performs aggregation on a chunk of tuples using SQL aggregate operators, which can be multi-level and multiple dimensional. For example, with reference to the example of FIG. 4, an aggregator may aggregate vehicle data to generate per minute statistics on traffic volume, average speed, etc. The Agg station 304 in turn generates messages that it provides to a database query station 306. The messages provided by the Agg station 304 to the database query station 306 contain an unbounded output stream of messages that contain parameters for a further operation to be performed by the database query station 306 on the inserted chunks. Results of the queries are provided to an output station 230 for providing to a user (e.g., printing, displaying, etc.).

The stream analysis topology shown in FIG. 6 is specified below, where the query station ("db-agg") has stream data passed through.

```
public class Sql_PassBy_Topology {
  public static void main(String[ ] args) throws Exception {
    FileReadlineSpout spout = new
        LR_MiniBatchSpout1(args[0], 100);
    BasicStation parse = new LR_MiniBatchParseStation( );
    LR_InsertStation insert = new LR_InsertStation(1,
        "jdbc:vertica://adb-04.hpl.hp.com:5433/test",
        "com.vertica.Driver", "vertica", "", "LRdata",
        false);
    LR_AggDBStation db_agg = new LR_AggDBStation(1,
        "jdbc:vertica://adb-04.hpl.hp.com:5433/test",
        "com.vertica.Driver", "vertica", "", "INSERT INTO
        LRagg SELECT minute, xway, dir, seg, " +
        "CAST(AVG(speed) AS INTEGER) AS
        avg_speed, " + "SUM(DISTINCT vid)
        AS volume FROM LRdata " +
        "WHERE minute = ? GROUP BY minute, xway,
        dir, seg");
    LR_AnalyticQueryStation ana = new
        LR_AnalyticQueryStation(30, "jdbc:vertica://adb-
        04.hpl.hp.com:5433/test", "com.vertica.Driver",
        "vertica", "", "SELECT minute,xway,dir,
        seg, SUM(volume)*AVG(avg_speed)/1000 AS
```

-continued

```
stat " + "FROM LRagg WHERE minute >= ? AND
minute < ? " + "GROUP BY minute, xway, dir,
seg", true);
PrintStation print = new PrintStation( );
TopologyBuilder builder = new TopologyBuilder( );
builder.setSpout("spout", spout, 1);
builder.setBolt("parse", parse, 8).shuffleGrouping("spout");
builder.setBolt("insert", insert, 1).globalGrouping("parse");
builder.setBolt("db_agg", db_agg,
1).shuffleGrouping("insert");
builder.setBolt("ana", ana, 4).shuffleGrouping("db_agg");
builder.setBolt("print", print, 1).shuffleGrouping("ana");
...
```

Referring to the topology, the data stream from the "parse" stations flow to the "insert" station and then are appended to the LRdata table, i.e., sink to the database, on a per minute basis. The insert station sends a token bearing the current minute timestamp to the db_agg station and the db_agg station launches an aggregate query on the last minute data. The query is executed in the database layer with the aggregation results appended to the LRagg table. Per-minute (by timestamp), a token bearing the current minute timestamp is passed from the db_agg station to the ana station, and every 30 minutes (the first parameter of its constructor) the ana station runs a query to retrieve the aggregation results of the last 30 minutes for further analysis; the resulting data (not token) are streamed out to the next station, the "print" station.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for processing a database query on an input stream on a chunk by chunk basis, comprising:
    binding a stationed operator to a database query engine, wherein:
        the stationed operator is classified according to classes of stream operators, and further wherein an execution pattern of a class of the stationed operator depends on class meta-properties including input/output, blocking, caching and stream grouping characteristics,
        the stationed operator comprises system utilities to connect to the database query engine and execute queries and an open executor to execute user-supplied application logic to define and apply the queries to an unbounded input stream of input tuples on the chunk by chunk basis, and
        the unbounded input stream of input tuples have a stream grouping specifying tuple partitioning information for the stationed operator;
    receiving the unbounded input stream of input tuples at the stationed operator on the chunk by chunk basis;
    applying, by the stationed operator and based on the class of the stationed operator and the stream grouping, a query of the queries defined by the user-supplied application logic to the unbounded input stream of input tuples on the chunk by chunk basis to produce an output packet for each such chunk, wherein the query is applied based on whether the query is specified according to a database input schema;
    passing a parallel execution message to a parallel stationed operator to execute multiple distributed instances of execution; and
    generating an unbounded output stream comprising the output packets.

2. The method of claim 1 wherein each chunk of the input stream is defined by the user-supplied application logic as either a predefined number of input tuples or as all input tuples received during a specified period of time.

3. The method of claim 1 wherein the input tuples contain topology information, a data schema and messages for downstream stationed operators.

4. The method of claim 1 wherein the unbounded input stream of input tuples defines a table in a database.

5. The method of claim 4 wherein applying the query comprises applying the query to the table on the chunk by chunk basis, the chunk defined by the input tuples.

6. The method of claim 4 wherein generating the output stream comprises generating the output stream to comprise a message about parameters of the user-supplied application logic and the method further comprises storing results of the query in the table of the database.

7. A system for processing a database query on an input stream on a chunk by chunk basis, comprising:
    a stationed operator module comprising system utilities to connect to a database query engine and execute a query and an open executor to execute user-supplied application logic to define and apply the query to an unbounded input stream of input tuples on the chunk by chunk basis, wherein:
        the stationed operator is classified according to classes of stream operators, and further wherein an execution pattern of a class of the stationed operator depends on class meta-properties including input/output, blocking, caching and stream grouping characteristics, and
        the unbounded input stream of input tuples have a stream grouping specifying tuple partitioning information for the stationed operator,
    and further wherein the stationed operator is to:
    bind to the database query engine;
    receive the unbounded input stream of input tuples on the chunk by chunk basis;
    apply, based on the class of the stationed operator and the stream grouping, the user-supplied application logic to each successive chunk of the unbounded input stream of input tuples on a chunk by chunk basis, wherein applying the application logic includes applying the query defined by the application logic based on whether the query is specified according to a database input schema;
    produce an output packet based on the each successive chunk;
    pass a parallel execution message to a parallel stationed operator to execute multiple distributed instances of execution; and
    generate an unbounded output stream including the output packets.

8. The system of claim 7 wherein the unbounded input stream of input tuples defines a table in a database, and wherein the stationed operator module is to apply the user-supplied application logic to the table on the chunk by chunk basis, each such chunk defined by the input tuples, to produce the output packets.

9. The system of claim 8 wherein the stationed operator is to apply the user-supplied application logic to the table on the chunk by chunk basis to produce an output packet from each chunk.

10. The system of claim 9 wherein the stationed operator module is to output a stream of output packets that contain a result of the user-supplied application logic to each chunk.

11. The system of claim 9 wherein the stationed operator module is to generate a stream of output packets that contain a message about the parameters of the user-supplied application logic, and the stationed operator module is to store results of user-supplied application of the application logic in the database.

12. A system for processing a database query on an input stream on a chunk-wise basis, comprising:
a query engine;
a first stationed operator comprising system utilities to connect to the query engine and execute a query and an open executor to execute user-supplied application logic to define and apply the query to an unbounded input stream of input tuples on a chunk by chunk basis, and wherein the first stationed operator is further to:
receive the unbounded input stream of input tuples on the chunk by chunk basis, and to insert the input tuples of the input stream on the chunk by chunk basis into a database,
generate a first unbounded output stream of messages that contain the parameters for a next operation to be performed on the chunks of the input stream being inserted into the database on the chunk by chunk basis,
pass a parallel execution message to a parallel stationed operator to execute multiple physical instances of execution in a distributed way, and wherein:
the first stationed operator is classified according to classes of stream operators, and further wherein an execution pattern of a class of the first stationed operator depends on class meta-properties including input/output, blocking, caching and stream grouping characteristics,
the unbounded input stream of input tuples have a stream grouping specifying tuple partitioning information for the first stationed operator, and
the generating the first unbounded output stream includes applying, based on the class of the first stationed operator and the stream grouping, the query defined by the user-supplied application logic to the input stream of input tuples on the chunk by chunk basis, wherein the query is applied based on whether the query is specified according to a database input schema; and
a second stationed operator to receive the first output stream from the first stationed operator and perform the next operation defined by the messages, wherein the results of the next operation are stored in the database.

13. The system of claim 12 wherein the chunks of the input stream are defined by data packets.

14. The system of claim 12 wherein the second stationed operator is to generate a second unbounded output stream of messages that contain parameters for a further operation to be performed on the chunks of the input stream.

* * * * *